United States Patent [19]

Minoura

[11] 4,037,937
[45] July 26, 1977

[54] VARIABLE MAGNIFICATION LENS SYSTEM USING SYMMETRIC LENS OF VARIABLE FOCAL LENGTH

[75] Inventor: Kazuo Minoura, Shirane, Japan

[73] Assignee: Canon Kabushiki Kaisha, Tokyo, Japan

[21] Appl. No.: 466,601

[22] Filed: May 3, 1974

Related U.S. Application Data

[63] Continuation of Ser. No. 299,307, Oct. 20, 1972, abandoned.

[30] Foreign Application Priority Data

Oct. 22, 1971   Japan .................................. 46-83374
Apr. 17, 1972   Japan .................................. 47-37668

[51] Int. Cl.² ............................................ G02B 15/16
[52] U.S. Cl. ..................................... 350/184; 350/214

[58] Field of Search ................................ 350/184, 186

[56] References Cited

U.S. PATENT DOCUMENTS 3,687,522   8/1972   Lynch et al. ..................... 350/184
3,728,010   4/1973   Mikami ............................. 350/184

Primary Examiner—John K. Corbin
Attorney, Agent, or Firm—Toren, McGeady and Stanger

[57] ABSTRACT

A variable magnification optical system comprising a stationary lens element and a movable lens element which when varying the focal length of the variable magnification optical system, are moved always in a relationship symmetric with respect to the center of the variable magnification optical system so as to effect a desired magnification.

10 Claims, 6 Drawing Figures

VARIABLE MAGNIFICATION LENS SYSTEM USING SYMMETRIC LENS OF VARIABLE FOCAL LENGTH

This is a continuation of application Ser. No. 299,307 filed Oct. 20, 1972 now abandoned.

In general, the copying work is performed using a lens of definite focal length, if need be, with change in magnification which is effected by moving the lens along its optical axis, usually with variation in a relative distance between the plane of an object to be photographed and the plane of a film. But this invention is concerned with a lens system which makes it possible to carry out the copying work with change in magnification by movement of the lens system between an object to be photographed and the plane of a film which are always made stationary, having a large effect of making the work convenient when using it with large-scale process cameras and copying apparatus, because both of a support carrying an original copy and the film plane may be fixed.

Hitherto, in order to vary a magnification of an image between $m-1/m$ times using a lens of definite focal length when photographing, a distance between the object plane and the image plane is usually varied with movement of the entire lens system. But, this invention relates to a lens system which makes it possible to effect a desired magnification of an image of $m-1/m$ times by movement of the lens system between the object plane and the image plane which are always made stationary.

The lens system of the present invention is characterized in that (1) the entire lens system comprises four lens groups, two symmetric stationary lens groups of which are arranged at positions farthest from a diaphragm, interior to them are arranged the other two symmetric movable lens groups, the movably lens groups being composed of symmetric lens of variable focal length capable of carrying the focal length of the entire lens system from the diaphragm with variation in an interval between the movable lens groups and by movement of them as an unit, whereby the image-forming condition is always perfectly satisfied by giving to the entire lens system a displacement having a subordinate relation to the movement of the movable lens groups between the object and film planes fixed at a fixed distance.

(2) a pair of outer movably lens groups symmetric with respect to the diaphragm, and a pair of inner stationary lens groups symmetric to the diaphragm are arranged whereby the image-forming condition is always satisfied with change in magnification by moving the movable lens groups in a manner symmetric with respect to the diaphragm, and at the same time by giving to the entire lens system a displacement having a subordinate relation to the symmetrical movement of the movable lens groups, while fixing the object plane and image plane at a fixed distance.

The present invention will be described in details referring to the attached drawings.

Figure 1:
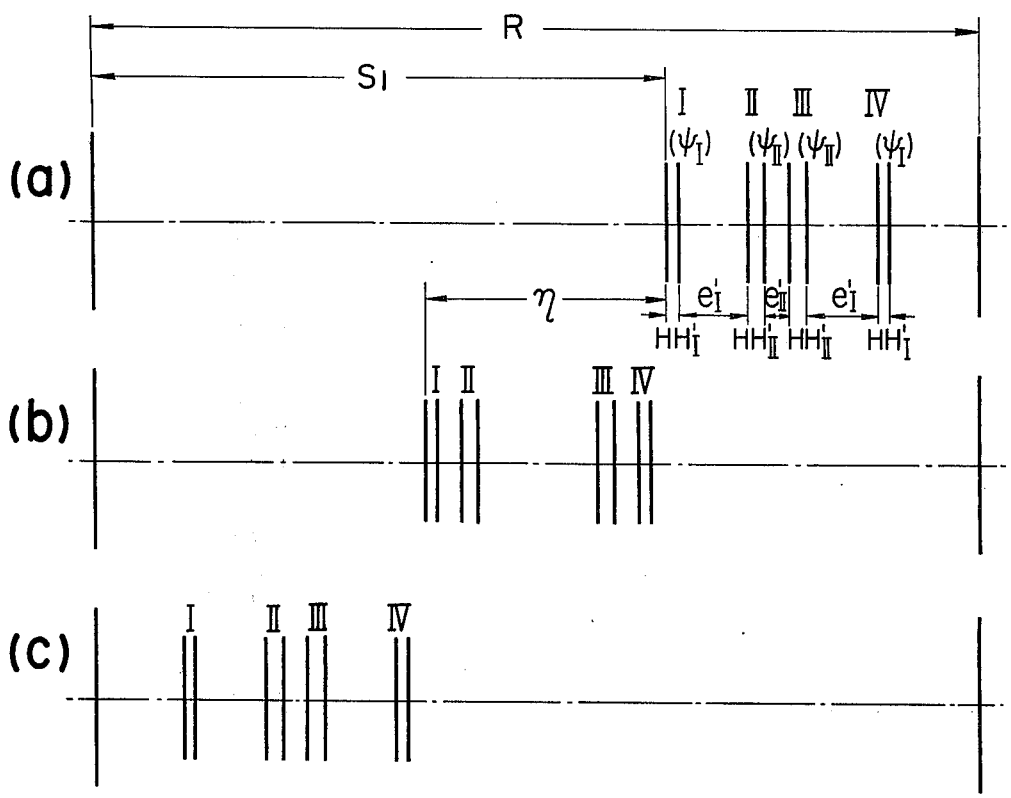
FIG. 1 is a diagrammatic view for illustrating the principle of the lens system of the present invention and displacements of the lens groups occurring with change in magnification.

The principle of the lens system of this invention will be explained in reference to FIG. 1, wherein I, IV denote two symmetric stationary lens groups, and II, III denote two symmetric movable lens groups, Let $e'_I$ be a distance between the principal points of adjacent stationary lens group and movable lens group, $e'_{II}$ a distance between the principal points of two movable lens groups, $\phi_I$ an overall power of each stationary lens group, $\phi_{II}$ an overall power of each movable lens group, and put $$2 e'_I + e'_{II} = E \, (=\text{const}) \tag{1}$$

$$\phi_I + \phi_{II} = A \, (=\text{const}) \tag{2}$$
$$\phi_I \phi_{II} = B \, (=\text{const}) \tag{3}$$

Then an overall power of the entire lens system is expressed as $$\Phi = 2e'_I{}^2 B^2 + e'_I{}^2 (2\phi_I - BE - 4A)B + 2e'_I(A^2 + ABE - A\phi_I - B) + A(2 - AE) \tag{4}$$

Further, with $HH'_I$ a distance of the principal points of each stationary lens group, and $HH'_{II}$ a distance between the principal points of each movable lens group, a distance $HH'$ between the principal points of the entire lens system is expressed as $$HH' = E + 2(HH'_I + HH'_{II}) - 2[e'_I \phi_{II}/(A - e'_I B) \\ + \{E - 2e'_I + 2e'_I \phi_I/(A - e'_I B)\}(A - e'_I B)/\phi] \tag{5}$$

$\phi$ and $HH'$ are found to be functions of only $e'_I$. Letting R be a distance between the plane of an object to be photographed and the plane of an image, and letting $m$ be a magnification of an image at that time, we obtain with the help of the thus-given formulae (4), (5)

$$R = (2 + m + 1/m)/\Phi + HH' \tag{6}$$

When the movable lens groups are in a special condition, for example, $e'_I = e'_{Io}$, an overall power of the entire lens system and a principal point interval of the entire lens system can be obtained from formulae (4), (5), and further if the magnification $m_o$ of the image is given, we can obtain the distance between the object and image planes from formula (6). Writing the overall power of this case as $\Phi_o$, the principal point interval as $HH'_o$, and the distance between the object and image planes as $R_o$, we get $$R_o = (2 + m_0 + 1/m_o) \Phi_o + HH'_o \tag{6'}$$

Substituting $R_o$ for R in formula (6), we have $$R_o = (2 + m + 1/m)/\Phi + HH' \tag{6''}$$

From this formula, we can derive a magnification $m$ occurring when the movable lens groups is in a general condition in a formula expressed as $$m = [\{(R_o - HH')\Phi - 2\} \pm \sqrt{\{(R_o - HH')\phi - 2\}^2 - 4}]/2 \tag{7}$$

Letting $\hat{g}_1$ be a distance from the front principal point of the entire lens system to the object plane, we get $$\hat{g}_1 = (1 + 1/m)/\Phi \tag{8}$$

Hence, a distance $s_1$ from the front principal point of the stationary lens group nearer the object to the object plane is expressed as $$S_1 = \hat{g}_1 - \{E + 2(HH_I' + HH_{II}') - HH'\}/2 \quad (9)$$

In case the movable lens groups are in the condition $e'_I = e'_{IO}$ the distance $s_{IO}$ from the front principal point of the stationary lens group to the object plane is written $$s_{10} = \hat{g}_{10} - \{E + 2(HH_I' + HH_{II}') - HH_o'\}/2 \quad (9')$$

wherein $\hat{g}_{10}$ is the distance from the front principal point of the entire lends system to the object plane in the case of $e'_I = e'_{IO}$, given by $$\hat{g}_{10} = (1 + 1/m_o)/\Phi_0 \quad (8')$$

When the movable lens groups are transferred to a state other than $e'_I = e'_{IO}$, a distance $\eta$ through which a displacement of the entire lens system is made can be derived from formulae (9), (9'), being written as $$\eta = s_1 - s_{10}$$
$$= g_1 - g_{10} + (HH' - HH_0')/2$$
$$= (1+1/m)/\phi - (1+1/m_o)/\phi + (HH' - HH_0')/2 \quad (10)$$

Since the magnification $m_o$ occurring when $e'_I = e'_{IO}$ is given by $$m_o = [\{(R_o - HH_0')\phi_o - 2\} \pm \sqrt{\{R_o - HH_0'\}\phi_0 - 2\}^2 - 4}]/2 \quad (7')$$

substituting in formula (10) $m_o$ and $m$ defined by formula (7), we have $$= \pm \tfrac{1}{2} \tfrac{1}{\Phi} \sqrt{\{(R_o - HH')\Phi - 2\}^2 - 4}$$
$$\pm \tfrac{1}{2} \tfrac{1}{\Phi_o} \sqrt{\{(R_o - HH_o')\phi_o - 2\}^2 - 4} \quad (10')$$

In conclusion, a displacement of the movable lens groups from the condition $e'_I = e'_{IO}$ to another condition varies the overall power and distance between the principal points of the entire lens system, so that the lens system should be displaced through a distance $\eta$ given by formula 10 so as to satisfy the image-forming relationship under the condition that the object and film planes are fixed at a fixed distance $R_o$. A magnification resulting from the displacement is given by formula (7). The signs of the first term of formula (10') should be chosen in the same order as those of formula (7), while the signs of the second term of formula (10') should be chosen in the same order as those of the formula (7'). But the signs of the first and second terms of formula (10') are not always required to be combined in the same order.

FIGS. (a) (b) (c) of FIG. 1 show relations between the movement of the entire lens system and the movement of variable lens groups with change in magnification, (a) showing a case of $1/m$ magnification, (b) showing a case of unit magnification, and (c) showing a case of $m$ magnifications. The focal length of the entire lens system occurring in the case of $m$ magnifications is equal to that occurring in the case of $1/m$ magnification.

Figure 2:
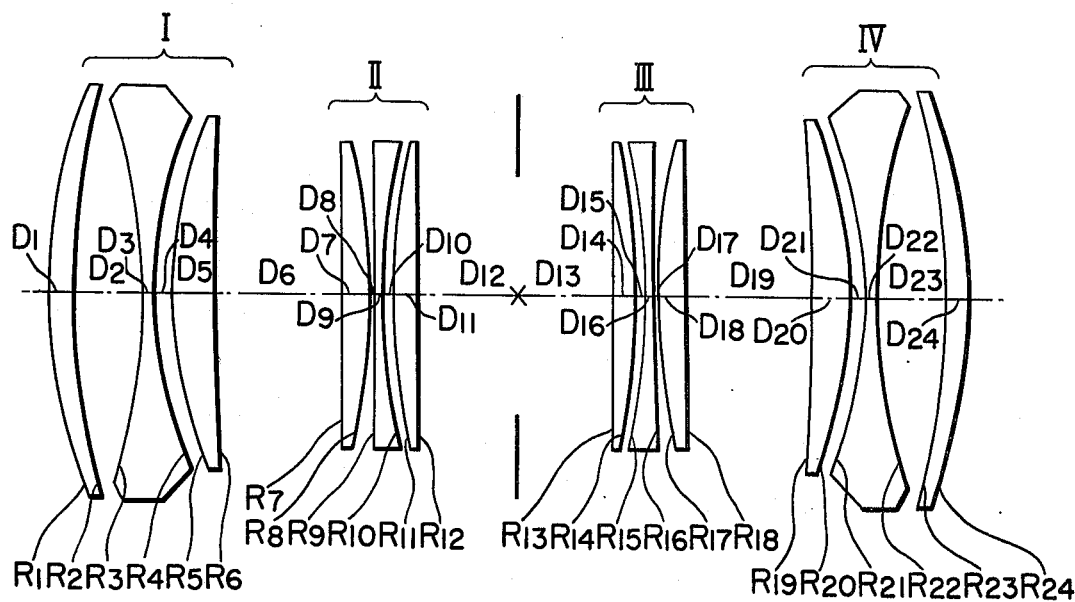
FIG. 2 is a lens block diagram of one embodiment of the present invention.

An example of the lens system of the present invention is illustrated in the following. As shown in FIG. 2, the entire lens system consists of twelve lens elements which are divided into four groups, group 1 and group 1V of which are stationary lens groups, and group 11 and group 111 of which are movable lens groups, each being composed of three symmetric lens elements.

The constructional data in terms of
R: The radii of curvature of the lens refracting surfaces
D: The axial thickness of the lens elements, or the axial air spacing of the lens elements
N: The refractive index (for $d$ line) of the lens element glasses
V: The Abbe number of the lens element glasses are:

| | | |
|---|---|---|
| Stationary lens system | $R_1 = -R_{24} = 45.35861$<br>$D_1 = D_{24} = 2.10601$<br>$R_2 = -R_{23} = 68.40033$<br>$D_2 = D_{23} = 5.75499$<br>$R_3 = -R_{22} = -55.76736$<br>$D_3 = D_{22} = 0.99857$ | $N_1 = N_{12} = 1.62360 \; V_1 = V_{12} = 46.9$<br><br>$N_2 = N_{11} = 1.55957 \; V_2 = V_{11} = 61.2$ |
| | $R_4 = -R_{21} = 35.21118$<br>$D_4 = D_{21} = 1.30032$<br>$R_5 = -R_{20} = 38.29087$<br>$D_5 = D_{20} = 3.64275$<br>$R_6 = -R_{19} = 316.18198$<br>$D_6 = D_{19}$ (Variable) | $N_3 = N_{10} = 1.53269 \; V_3 = V_{10} = 45.9$ |
| Movable lens system | $R_7 = -R_{18} = \infty$<br>$D_7 = D_{18} = 2.59752$<br>$R_8 = -R_{17} = -52.4948$<br>$D_8 = D_{17} = 0.02489$<br>$R_9 = -R_{16} = -556.98922$<br>$D_9 = D_{16} = 0.76526$ | $N_4 = N_9 = 1.69346 \; V_4 = V_9 = 53.3$<br><br>$N_5 = N_8 = 1.66691 \; V_5 = V_8 = 33.0$ |
| | $R_{10} = -R_{15} = 55.40340$<br>$D_{10} = D_{15} = 0.90213$<br>$R_{11} = -R_{14} = 62.87554$<br>$D_{11} = D_{14} = 1.80738$<br>$R_{12} = -R_{13} = \infty$<br>$D_{12} = D_{13}$ (Variable) | $N_6 = N_7 = 1.66986 \; V_6 = V_7 = 57.4$ |

In this example, putting $D_6 = D_{19} = l_1$,
$D_{12} = D_{13} = l_2$

This condition gives the following values for the focal length $f$ and the principal point interval $HH'$ of the entire lens system in connection with representatives values of $l_1$.

| $l_1$ | 17.93378 | 10.67783 | 3.42188 |
|---|---|---|---|
| $f$ | 100 | 125.66969 | 161.89796 |

-continued

| HH' | 14.81407 | 13.24961 | 9.54095 |

Further the power $\phi_1$ of the stationary lens group and the power $\phi_{11}$ of the movable lens group are $$\phi_1 = -8.00131 - 10^{-3}$$

$$\phi_{11} = 1.06372 - 10^{-2}$$

Figure 3:
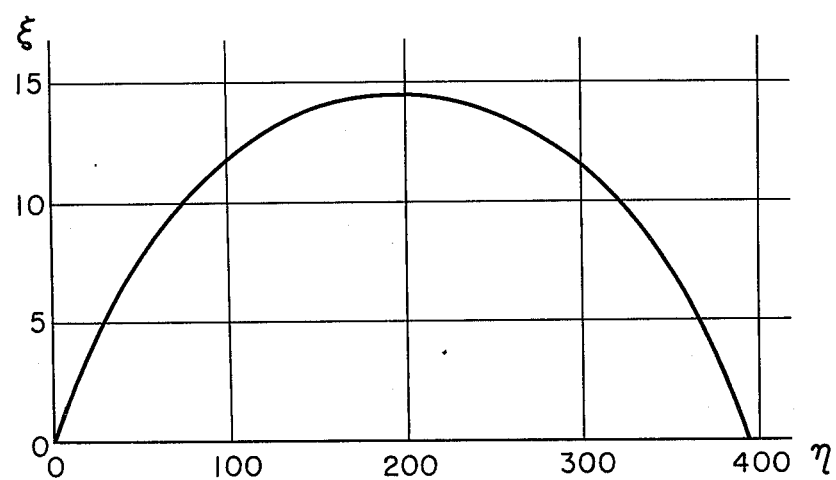
FIGS. 3–6 are graphs for illustrating variations of the moved distance of the movable lens group, the focal length, magnification, principal point interval of the entire lens system with respect to the moved distance of the entire lens system in said embodiment.
Figure 4:
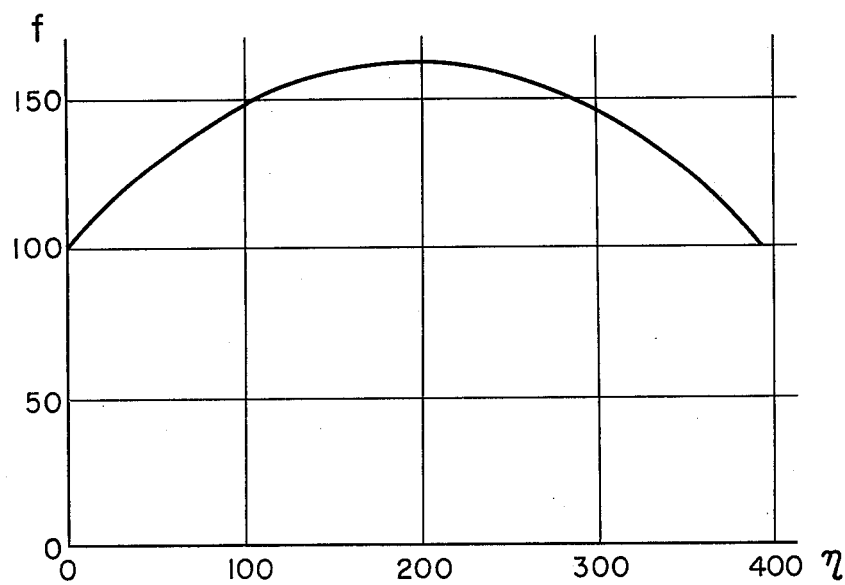
Figure 5:
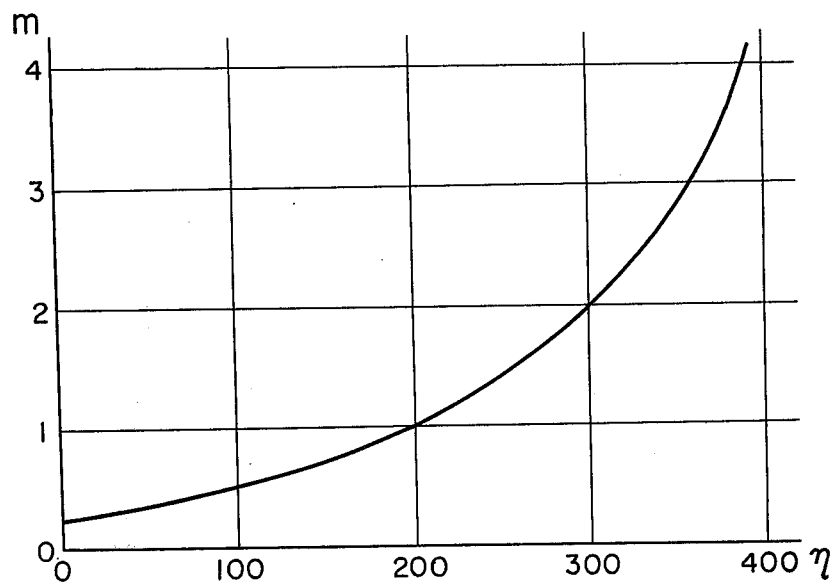
Figure 6:
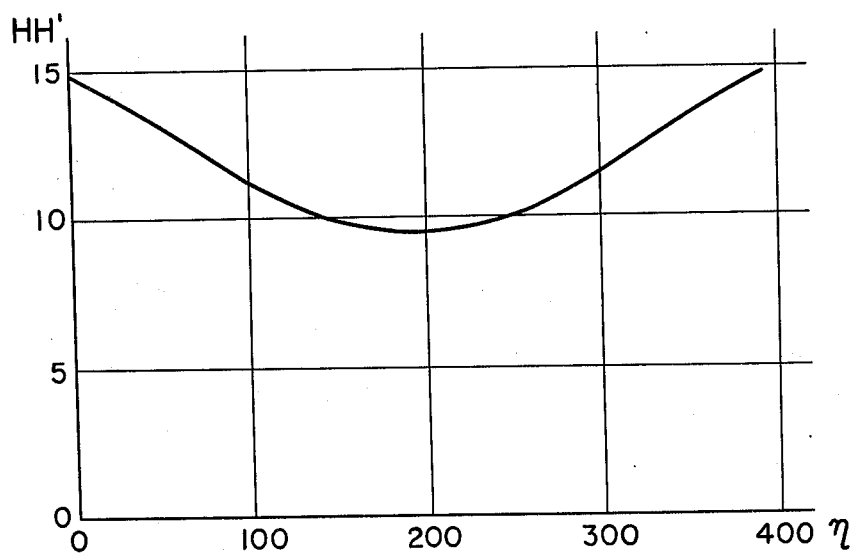

FIGS. 3 through 6 show variations of the moved distance of the movable lens group, focal length, magnification and principal point interval of the entire lens system with the moved distance of the entire lens system under the condition that the distance $R_0$ between the object plane and the film plane is kept at $R_o = 657.13$ in the above-mentioned example, FIG. 3 showing the relation between the moved distance $\eta$ of the entire lens system and the moved distance $\xi$ of the movable lens group, FIG. 4 showing the relation between $\eta$ and the focal length $f$ of the entire system, FIG. 5 showing the relation between $\eta$ and the magnification $m$, and FIG. 6 showing the relation between $\eta$ and the principal point interval HH' of the entire system. The functions $\xi$, $f$ and HH' are bisymmetric with respect to $\eta = 197.26$. The moved distance of the movable lens group can be determined from the following formula. Letting $l_{10}$ be the value of interval $l_1$ between the stationary lens group and the movable lens group resulting from the focal length of the entire lens system = 100, and $l'_1$ be a value of $\tau_1$ resulting from another focal length, we have $$\xi = l'_1 - l_{10}$$

What is claimed is:

1. In a variable magnification optical system having a central plane of symmetry and adapted to be interposed between a stationary object plane and a stationary image plane axially spaced from the object plane, wherein the system includes first and second pairs of lens groups each symmetrically disposed with respect to the central plane with the second pair being interior of the first pair, the improvement being that the lens groups of the first pair are stationary and the lens group of the second pair are respectively movable axially in symmetrical relation with respect to the central plane, and wherein the lens groups of the first pair are of negative power and the lens groups of the second pair are of opposite power and said two pairs of lens groups including all the lenses between the object and image planes and wherein the system is movable as a unit between the object and the image planes.

2. The improved system according to claim 1, wherein the magnification of the system is continually variable from $m$ to $1/m$, where $m = 0.25$.

3. The improved system according to claim 1, further comprising a diaphragm located at the central plane.

4. The improved system of claim 1 wherein the focal distance of the second pairs of lens groups is approximately equal to the focal distance of the entire optical system.

5. A variable magnification optical system, comprising a diaphragm, a pair of movable interior lens groups arranged on immediately opposite sides of said diaphragm, a pair of stationary lens groups arranged on opposite sides of the diaphragm exterior to the movable lens groups and aligned therewith, said movable lens groups being moved symmetrically with respect to said diaphragm and being corrected substantially in its color aberration, wherein the axial distance between the object plane and the image plane is fixed, and said system is movable as a unit between the object and image planes.

6. A system according to claim 5, wherein the interior lens group has a positive power and the stationary lens group has a negative power.

7. A system as in claim 6, wherein each of the movable interior lens groups and the stationary lens groups have at least one negative lens and at least one positive lens.

8. In a variable magnification optical system having a central plane of symmetry and adapted to be interposed between an object plane and an image plane axially spaced from the object plane wherein the system includes first and second pairs of lens groups each symmetrically disposed with respect to the central plane with the second pair being interior of the first pair, the improvement being that the lens groups of one of the pairs are stationary and the lens groups of the other pair are respectively movable axially in symmetrical relation with respect to the central plane, and wherein the lens groups of the second pair are of positive power and said two pairs of lens groups including all the lenses between the object and image planes and wherein a diaphragm is located at the central plane and each lens group in the first and second pairs includes a negative lens and a pair of positive lenses, the negative lens being disposed between the positive lenses.

9. The improved system according to claim 8, wherein each lens group of the first pair comprises a biconcave lens, a positive meniscus lens and a positive lens, the biconcave lens being disposed between the positive meniscus lens and the positive lens.

10. A system as in claim 8, wherein the interior pair of lens groups are movable and each lens group includes three symmetrical lenses, said twelve lenses having sequential refracting surfaces with radii $R_1$ to $R_{24}$, said lenses having sequential axial thicknesses and axial air spacings $D_1$ to $D_{24}$, said lenses having refraction indices $N_1$ to $N_{12}$ and Abbe numbers $V_1$ to $V_{12}$, said lenses having the following characteristics for the stationary groups:

$R_1 = -R_{24} = 45.35861$
$\quad D_1 = D_{24} = 2.10601 \qquad N_1 = N_{12} = 1.62360 \quad V_1 = V_{12} = 46.9$
$R_2 = -R_{23} = 68.40033$
$\quad D_2 = D_{23} = 5.75499$
$R_3 = -R_{22} = -55.76736$
$\quad D_3 = D_{22} = 0.99857 \qquad N_2 = N_{11} = 1.55957 \quad V_2 = V_{11} = 61.2$
$R_4 = -R_{21} = 35.21118$
$\quad D_4 = D_{21} = 1.30032$
$R_5 = -R_{20} = 38.29087$
$\quad D_5 = D_{20} = 3.64275 \qquad N_3 = N_{10} = 1.53269 \quad V_3 = V_{10} = 45.9$
$R_6 = -R_{19} = 316.18198$
$\quad D_6 = D_{19}$ (Variable)

and the following characteristics for the movable lens groups:

$R_7 = -R_{18} = \infty$
$\quad D_7 = D_{18} = 2.59752 \qquad N_4 = N_9 = 1.69346 \quad V_4 = V_9 = 53.3$
$R_8 = -R_{17} = -52.4948$
$\quad D_8 = D_{17} = 0.02489$
$R_9 = -R_{16} = -556.98922$
$\quad D_9 = D_{16} = 0.76526 \qquad N_5 = N_8 = 1.66691 \quad V_5 = V_8 = 33.0$
$R_{10} = -R_{15} = 55.40340$
$\quad D_{10} = D_{15} = 0.90213$
$R_{11} = -R_{14} = 62.87554$
$\quad D_{11} = D_{14} = 1.80738 \qquad N_6 = N_7 = 1.66986 \quad V_6 = V_7 = 57.4$
$R_{12} = -R_{13} = \infty$
$\quad D_{12} = D_{13}$ (Variable).

* * * * *